United States Patent
Ganser

(10) Patent No.: US 6,717,725 B2
(45) Date of Patent: Apr. 6, 2004

(54) AUTOMATED MICROSCOPE SYSTEM

(75) Inventor: Michael Ganser, Giessen (DE)

(73) Assignee: Leica Microsystems Wetzlar GmbH, Wetzlar (DE)

( * ) Notice: Subject to any disclaimer, the term of this patent is extended or adjusted under 35 U.S.C. 154(b) by 55 days.

(21) Appl. No.: 09/915,012

(22) Filed: Jul. 25, 2001

(65) Prior Publication Data

US 2002/0015224 A1 Feb. 7, 2002

(30) Foreign Application Priority Data

Aug. 3, 2000 (DE) .................. 200 13 359 U

(51) Int. Cl.[7] .................. G02B 21/06; G02B 21/00
(52) U.S. Cl. .................. 359/385; 359/368; 359/390
(58) Field of Search .................. 359/385–390

(56) References Cited

U.S. PATENT DOCUMENTS

| | | | |
|---|---|---|---|
| 4,329,015 A | | 5/1982 | Feinbloom .................. 359/385 |
| 4,695,137 A | * | 9/1987 | Jorgens et al. .............. 359/383 |
| 4,779,967 A | * | 10/1988 | Murphy et al. |
| 4,912,388 A | * | 3/1990 | Tanaka et al. .............. 318/640 |
| 5,048,941 A | * | 9/1991 | Hamada et al. ............. 359/368 |
| 5,325,231 A | * | 6/1994 | Tamura et al. |
| 5,537,247 A | * | 7/1996 | Xiao .......................... 359/368 |
| 5,559,631 A | * | 9/1996 | Remer et al. |
| 5,566,020 A | * | 10/1996 | Bradford et al. |
| 5,969,856 A | * | 10/1999 | Greenberg |
| 6,493,134 B2 | * | 12/2002 | Pensel ........................ 359/388 |

FOREIGN PATENT DOCUMENTS

| | | |
|---|---|---|
| DE | 198 39 777 | 3/1999 |
| WO | WO 94/07167 | * 3/1994 |

OTHER PUBLICATIONS

English Abstract of the Germany Reference No. 198 39 777.

* cited by examiner

Primary Examiner—Thong Nguyen
(74) Attorney, Agent, or Firm—Simpson & Simpson, PLLC

(57) ABSTRACT

The automated microscope system (30) comprises a box in which at least one control and power supply unit (34) is installed. The box is arranged physically separately from the microscope stand (32) and is connected to the microscope stand (32) with a cable (38). In one exemplary embodiment, a computer unit (36) is connected to the box that contains at least one control and power supply unit (34).

3 Claims, 3 Drawing Sheets

AUTOMATED MICROSCOPE SYSTEM

CROSS REFERENCE TO RELATED APPLICATIONS

This invention claims priority of the German utility model application 200 13 359.4 filed Aug. 3, 2000 which is incorporated by reference herein.

FIELD OF THE INVENTION

The invention concerns an automated microscope system. In particular, the invention concerns an automated microscope system which is configured such that no thermal, stability, or focus problems occur in the microscope stand.

BACKGROUND OF THE INVENTION

U.S. Pat. No. 4,329,015 discloses a microscope having an illumination device separate from the microscope stand. The illumination device is connected to the microscope via a light-guiding cable. The result of the physical separation between the microscope stand and the illumination device is that the heat generated by the illumination device is decoupled from the microscope stand. An automated microscope is not disclosed.

German Unexamined Application DE 198 39 777 discloses an electric microscope. The electric microscope comprises a data input unit for inputting objective data, an objective data memory, a control circuit, a revolving nosepiece, a nosepiece switcher, a nosepiece drive motor, a nosepiece driver circuit, a rotational position sensor for sensing the rotational position of the nosepiece, a coder for continuously sensing the rotational position of the nosepiece, and other components necessary for a conventional microscope. It is evident from the disclosure of DE 198 39 777 that all the aforementioned elements are arranged directly on or in the microscope stand. The problem of excessive heat generation by the large number of electronic elements in or directly on the stand was not acknowledged or addressed.

SUMMARY OF THE INVENTION

It is therefore the object of the invention to provide an automated microscope in which the thermal drift in the stand is prevented, and stable focus is thus guaranteed. A further object of the present invention is to provide an economical automation system for different microscope sizes and for different microscope types.

The object is achieved by an automated microscope system which is characterized in that a box is provided in which at least one control and power supply unit is installed; and that the box is arranged physically separately from the microscope stand and is connected to the microscope stand with at least one data cable.

One advantage of the invention is that the separation of the control and power supply unit from the microscope results in a particular degree of variability. Automation can be achieved for different microscope types. It is possible to achieve rapid adaptation of the control operations to the different microscope types (upright and/or inverted microscopes).

A further advantage of the invention is that there is no need to use large stands for the automation system with integrated electronics. In addition, because of the invention it is no longer necessary for different circuit boards to be produced for each of the various types of stand. This yields a considerable cost advantage, since multiple identical circuit boards can be produced and used with the different types of stand. For certain applications (specimen dissection, computer industry), the space around the microscope is sometimes restricted, so that it is important for the microscope itself to require little space. A small microscope, which is connected to the external control and power supply unit only via a cable, is particularly suitable here.

A further advantage of the invention is that the workstation around the microscope can be much better organized. Even with large microscopes having many controllable functions, it is often not possible to house all the control units in the microscope stand. Additional units for the corresponding controllers are thus required on the workstation, which negatively affects organization and ergonomics.

A further advantage of the invention is that the control box possesses the same shape and configuration regardless of the application.

BRIEF DESCRIPTION OF THE DRAWINGS

The subject matter of the invention is schematically depicted in the drawings and will be described below with reference to the Figures, in which.

DETAILED DESCRIPTION OF THE INVENTION

Figure 1:
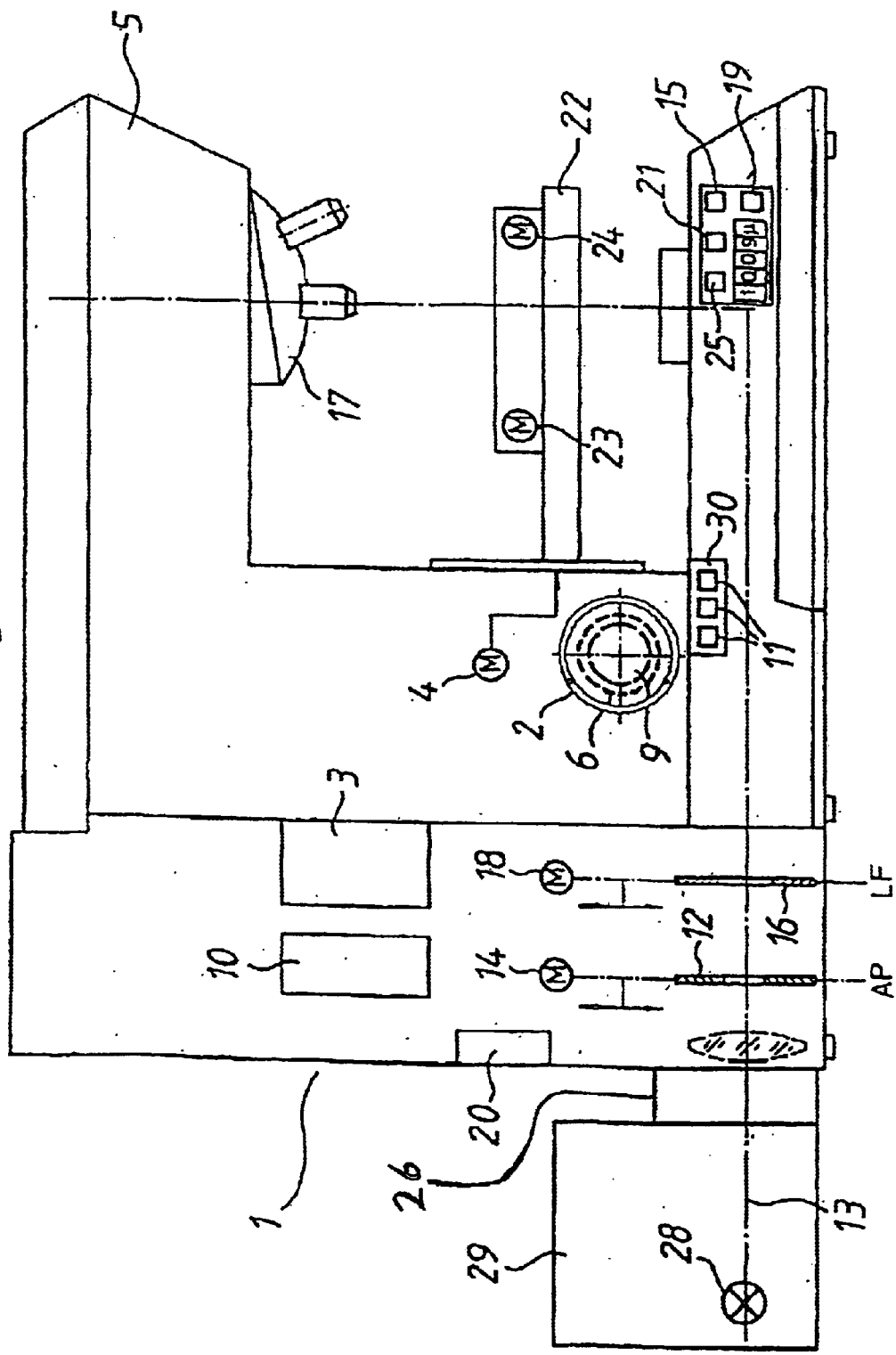
FIG. 1 shows a microscope according to the existing art.

FIG. 1 shows a microscope 1 having a revolving objective nosepiece 17; a specimen stage 22 adjustable in motor-driven fashion in the Z direction, on which is arranged an X-Y scanning device having drive motors 23 and 24; a focusing device having a stepping motor 4; and a central drive knob 2 that is coupled to an encoder 6. Encoder 6 delivers a slower or faster pulse train as drive knob 2 is rotated slowly or quickly. A control device 3 records only the number of pulses.

Several switches 11, 15, 19, 21, 25, which are electrically connected to control device 3, are provided on microscope stand 5. Also arranged in microscope 1 are a brightness control device 20 for lamp housing 29 with a light source 28, a speed control circuit 10 for focusing drive 4, and an interface 26. Arranged in illuminating beam path 13 of microscope 1, in aperture diaphragm plane AP and field diaphragm plane LF, respectively, are diaphragms 12, 16 whose openings are modifiable via respective motors 14, 18.

Drive knob 2 with downstream encoder 6 is electrically connected to control device 3. As knob 2 is turned, the pulses generated by encoder 6 are recorded in control device 3. Motor 4, preferably a stepping motor, has current applied to it via control device 3 for corresponding Z displacement of specimen stage 22. The number of encoder pulses determines the linear stroke of the motor; the number of pulses per unit time determines the motor displacement speed.

Additionally superimposed on this Z displacement, via three preselection buttons 11 and a speed control circuit 10, is a manually preselectable speed component that multiplies or steps down the encoder pulse train which depends on the rotation of drive knob 2. This can be utilized, for example, to establish a smooth startup of the motor control system.

With preselection buttons 11, it is possible in this fashion to simulate a mechanical conversion ratio drive; in other words, the user can preselect, by way of a corresponding speed, the functionality of a fine or coarse drive in order to focus any particular objective. For this purpose, for example, an individual pulse delivered by encoder 6 is used to control two or more steps at motor 4 in order to achieve a greater conversion ratio. This is advantageous, for example, when focusing low-magnification objectives. In combination with coded objective changing apparatuses, the advantageous drive ratio conversion can also be performed automatically by control device 3.

Arranged downstream from encoder 6 is a stepping motor 9 that is connected electrically to control device 3 and mechanically to the shaft of drive knob 2. Stepping motor 9 is configured as an electrically operating brake for drive knob 2. In predefined working regions, for example in the vicinity of the upper and lower end stops of microscope stage 22, stepping motor 9 is initially made currentless via control device 3 and is therefore rotated unimpededly by drive knob 2. Upon reaching the working region limit—which can be defined, for example, by way of suitable threshold values such as maximum permitted number of pulses—motor 9 is energized by the control device. In this state, it is difficult to continue turning drive knob 2. Control device 3 can control this function, for example, in such a way that the drag of drive knob 2 is continuously increased as the working region limit is reached, until complete immobilization occurs.

An X-Y scanning device, with drive motors 23 and 24, is provided on microscope stage 22. The X and Y motions are again controlled via drive knob 2. For that purpose, preselection switch 25 is electrically connected to control device 3. Upon actuation of this switch, for example, the Z-drive functionality of drive knob 2 is switched over to the X- or Y-drive functionality. This makes it possible, with drive knob 2, to arrive successively at a specific X and Y position for a specimen. The functionality of stepping motor 9 is retained, by analogy with the Z drive instance. The working region limits imposed here are the maximum X and Y displacement travels.

Brightness control device 20 for light source 28 is also electrically connected to control device 3. The brightness control functionality is switched over to drive knob 3 using switch 21. By analogy with the functions already described, the brightness of light source 28 can be adjusted by way of the encoder pulses of drive knob 2.

Aperture diaphragm 12 and field diaphragm 16, which are controllable in motorized fashion, are activated via switches 15 and 19. Actuating motors 14 and 18 are electrically connected to control device 3. After activation of the respective switch 15 or 19, actuating motor 14 or 18 is controlled via drive knob 2 and adjustment of the respective diaphragm 12 or 16 is accomplished.

The above-described drive motors or actuating motors are each stepping motors which are controlled by individual pulses that are emitted from encoder 6 and can be counted in control device 3. The position of diaphragms 12, 16, of microscope stage 22, and of the scanning device can be ascertained by way of the recorded pulses. As is clearly evident from FIG. 1, the electronic circuits necessary for controlling the microscope (control device 3, speed control circuit 10, brightness control device 20, and lamp housing 29) are provided in or directly on the stand of microscope 1.

Figure 2:
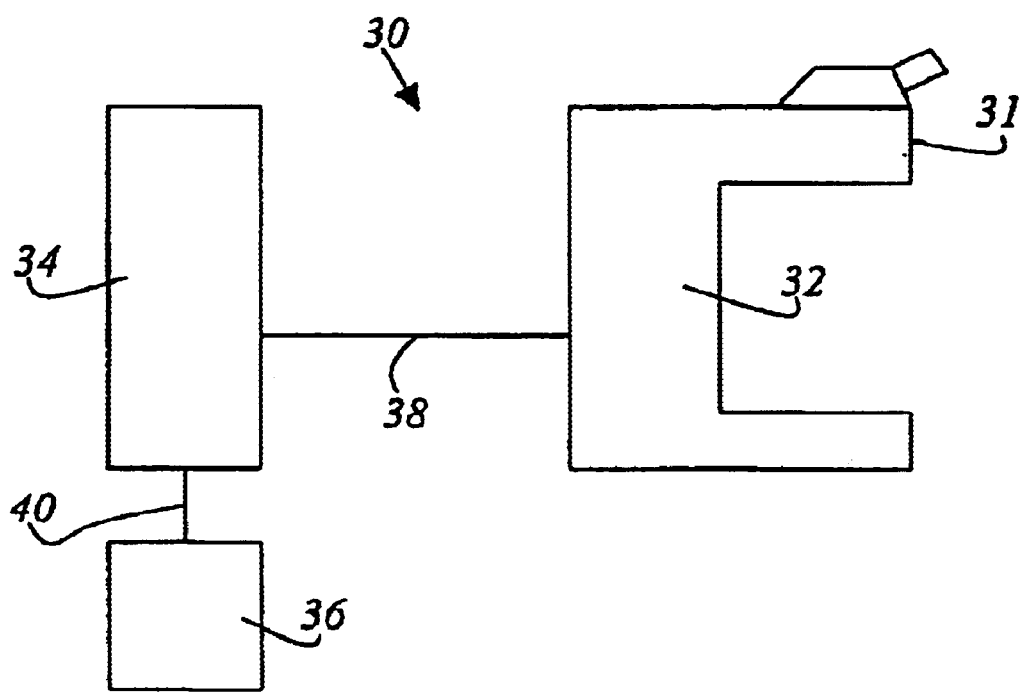
FIG. 2 shows an automatic microscope according to the invention.

An automatic microscope system 30 according to the invention is depicted in FIG. 2. The individual components of a microscope stand 32 need not be discussed further, since they have been sufficiently described in FIG. 1. Automatic microscope system 30 comprises a microscope stand 32, a control and power supply unit 34 and, in a further embodiment, also a computer unit or control panel 36. Computer unit 36 is connected to control and power supply unit 34 via a data cable 40. Control and power supply unit 34 itself is connected to microscope stand 32 via at least one distribution cable 38 which comprises electrical lines (not depicted) and optionally also a light guide (not depicted). By using a light guide, the light generated by a lamp (not depicted) in control and power supply unit 34 is transported into microscope stand 32, where it is coupled in suitable fashion into the optical beam path of microscope stand 32 and illuminates a specimen. It is also conceivable for the lamp to be built into microscope stand 32. In this embodiment, a corresponding transformer that represents the energy supply is located in control and power supply unit 34. Control and power supply unit 34 is configured as a closed box in which the various control units and power supply units (such as power supplies for the lamp, motors, etc.) are housed. Sufficient space is also present in the box so that additional equipment for controlling microscope 31 can be installed as applicable.

Figure 3:
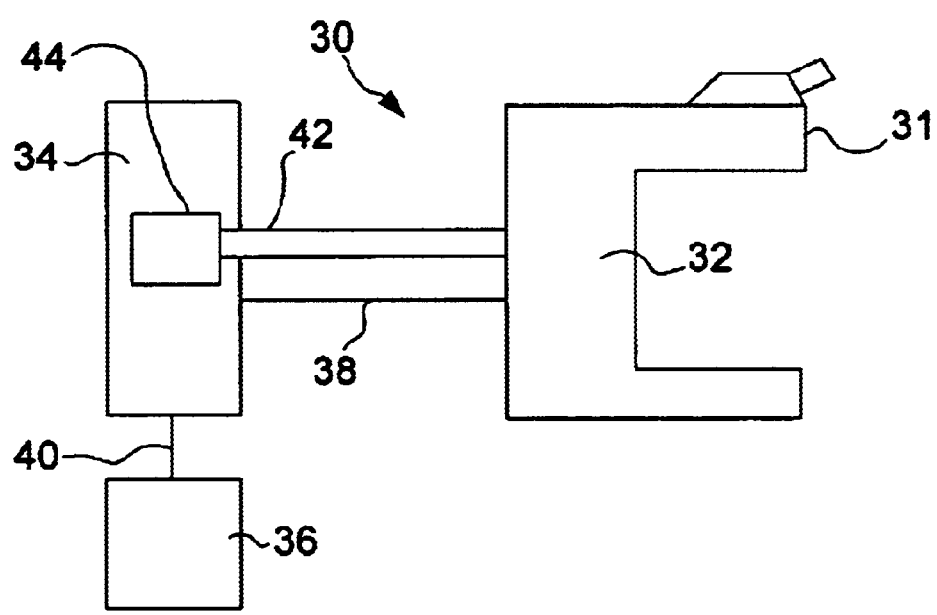
FIG. 3 shows an automatic microscope according to a second embodiment of the invention.

FIG. 3 shows a second embodiment of the present invention. Automatic microscope system 30 comprises a microscope stand 32, a control and power supply unit 34, and a computer unit or control panel 36. Computer unit 36 is connected to control and power supply unit 34 via a data cable 40. Control and power supply unit 34 itself is connected to microscope stand 32 via at least one distribution cable 38 which comprises electrical lines (not depicted). Light guide 42 is separate from data cable 38 in this embodiment. By using a light guide, the light generated by lamp 44 in control and power supply unit 34 is transported into microscope stand 32, where it is coupled in suitable fashion into the optical beam path of microscope stand 32 and illuminates a specimen.

The invention has been described with reference to a particular embodiment. It is nevertheless self-evident that changes and modifications can be made without thereby leaving the range of protection of the claims recited hereinafter.

PARTS LIST
1 Microscope
2 Drive knob
3 Control device
4 Focusing motor
5 Microscope stand
6 Encoder
9 Motor (for drive knobs 2)
10 Speed control circuit
11 Preselection switch
12 Aperture diaphragm
13 Illuminating beam path
14 Actuating motor (for aperture diaphragm 12)
15 Switch (actuating motor 14)
16 Field diaphragm
17 Revolving objective nosepiece
18 Actuating motor (field diaphragm 16)
19 Switch (actuating motor 18)
20 Brightness control device
21 Switch (for brightness control device 20)
22 Microscope stage
23 Actuating motor (for X displacement of 22)
24 Actuating motor (for Y displacement of 22)
25 Preselection switch (for actuating motor 23 and 24)
28 Light source
29 Lamp housing 30 Automatic microscope system
31 Microscope
32 Microscope stand
34 Control and power supply unit
36 Operating and computer unit
38 Distribution cable
40 Data cable
AP Aperture diaphragm plane
LF Field diaphragm plane

What is claimed is:

1. An automated microscope system, comprising:

a microscope including a microscope stand, where said stand does not include a light source;

a box including at least one control and power supply unit, said box arranged physically separate from said microscope stand and connected to said stand by at least one connecting cable, said control and power supply unit including means for controlling a motor housed within said microscope;

an illumination unit housed within said box; and, a light guide operatively arranged to couple said illumination unit to said stand.

2. The automated microscope system (30) as defined in claim 1 comprising:

an operating and computer unit (36) connected to the box having said at least one control and power supply unit (34).

3. The automated microscope system (30) as defined in claim 1 wherein said motor is selected from the group consisting of focusing motor, drive knob motor, aperture diaphragm motor, field diaphragm motor, stage X-direction motor, and stage Y-direction motor.

* * * * *